Nov. 30, 1965     M. B. ROGERS ETAL     3,220,630

HEATING DEVICE FOR JOINING PIPE

Filed Jan. 21, 1963     4 Sheets-Sheet 1

INVENTORS.
MAXWELL BERNARD ROGERS,
DAVIS TEMPLETON BRECKENRIDGE.
BY
Egor L. Shlopak.
their ATTORNEY.

Nov. 30, 1965  M. B. ROGERS ETAL  3,220,630
HEATING DEVICE FOR JOINING PIPE
Filed Jan. 21, 1963  4 Sheets-Sheet 3

INVENTOR.
MAXWELL BERNARD ROGERS,
DAVIS TEMPLETON BRECKENRIDGE.
BY
Egor G. Shlopak
their ATTORNEY.

United States Patent Office 3,220,630
Patented Nov. 30, 1965

3,220,630
HEATING DEVICE FOR JOINING PIPE
Maxwell Bernard Rogers, Baltimore, and Davis Templeton Breckenridge, Lutherville, Md., assignors to Catalyst Research Corporation, Baltimore, Md., a corporation of Maryland
Filed Jan. 21, 1963, Ser. No. 252,872
8 Claims. (Cl. 228—44)

This invention relates to a heating device for joining pipe and particularly a heat clamp which is adapted to be secured around a pipe fitting that is to be joined to other pipe by soldering.

Conventionally, the surfaces of pipe to be joined are heated by a torch or other means producing an open flame. After the pipe joints have been formed by telescoping the pipe and so heated, a fusable material selected from commonly known solders is applied to the joints. The solder flows by capillary action, and when cooled, forms a solid bond between the joined pipe. Ordinarily, lengths of pipe are joined together by pipe fittings such as sleeves, T's and L's. The pipe and fitting are usually made so that when the end of the pipe is inserted within the fitting, the surfaces will be sufficiently close together to form an annular space which receives the solder. The solder melts and flows readily into this space after the pipe has been sufficiently heated. When installing plumbing lines, for example, it is found that an open flame is undesirable for connecting pipe since it normally passes through or is close to inflammable materials such as building joists, studs, etc. Also, the installer must remain close to the flame. In addition, when installing such plumbing lines, the pipe joints are, in many instances, placed in areas inaccessible to a heating torch, or at best, so located as not to permit the flame to evenly heat the pipe. Another disadvantage is that such heating equipment is heavy, unwieldy and requires that the torch be held while the solder is applied.

Accordingly, it is among the objects of this invention to provide a heat clamp for joining pipe which minimizes the fire hazard, which overcomes the inaccessibility factor, which controls the heat more evenly, which is easily applied and transported, and which permits the joining of pipes in a manner most suitable to the installer.

Other objects and advantages will become apparent from the following description and annexed drawings in which.

Figure 1:
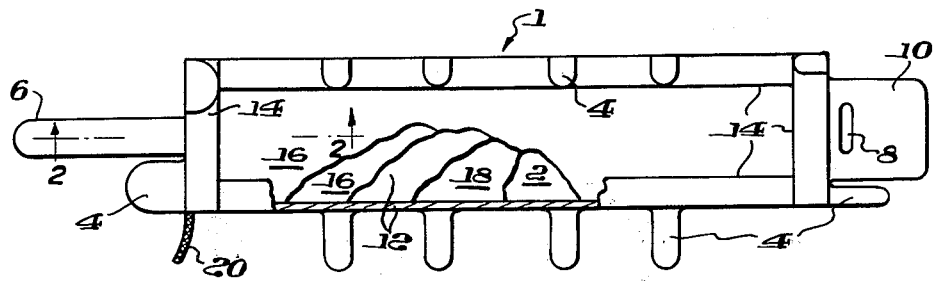
FIG. 1 shows a plan view of one form of the heat clamp with parts partially assembled and parts broken away.
Figure 2:
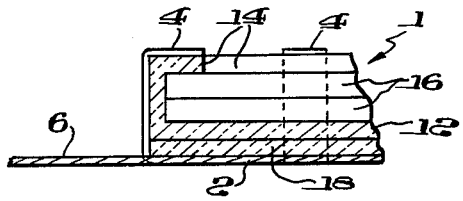
FIG. 2 is an exaggerated fragmentary sectional view of the clamp taken on line 2—2 of FIG. 1.
Figure 3:
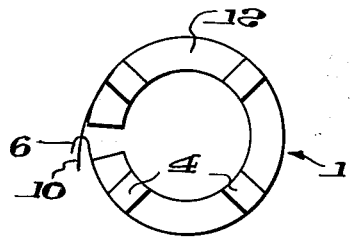
FIG. 3 is a diagrammatic side elevation of the clamp of FIG. 1 as the clamp would be viewed on a pipe.

Noting FIGS. 1, 2 and 3, heat clamp 1 comprises a flat, flexible strip 2 formed from a metal blank and includes tabs 4 extending from the sides thereof. The ends of strip 2 also contain similar tabs 4 extending therefrom and one end of the strip includes a clamping tongue 6 which is inserted into an aperture 8 in receiving tab 10 extending from the other end of the strip. A trough-like housing 12 of substantially the same size as strip 2 is positioned on the strip within the boundaries thereof. Housing 12 is formed from a heat insulating material, such as asbestos, and comprises a bottom wall, side walls, end walls and includes bent over strips 14 forming narrow flaps around the top of the housing. The housing 12 contains the heating or exothermic reaction material which may be composed of well-known heating compositions which, when ignited, generate sufficient heat to pipes for melting the solder. An example of a suitable heating material is disclosed in application Serial Number 252,587, filed on even date. As shown, the material is formed of two identical rectangular sheets 16, 16 of approximately the same rectangular configuration as housing 12. A fuse 20 containing ignitable material is secured adjacent material 16. To further insulate the exothermic material from the atmosphere, a sheet 18 of asbestos and of the same rectangular configuration as the bottom of housing 12 is placed between the bottom of housing 12 and the top of strip 2. Obviously, the heating material can be made up in single or plural sheets or in other forms, but two sheets are used to increase the flexibility of the heat clamp when folded around the pipe fitting. Tabs 4 are bent over flaps 14 of housing 12 in a manner shown in the upper half of FIG. 1, and in FIG. 2. The lower half of FIG. 1 shows tabs 4 in the unbent position. In addition to helping contain sheets 16 in housing 12, flaps 14 decrease the conduction of heat to tabs 4. Also, flaps 14 tend to shield the visible heat from the user of the clamp and aids in confining the heat toward the center of the clamp. Thusly, the asbestos housing 12 with its flaps 14 and the asbestos layer 18 direct the heat toward the pipe and reduce the spillage of molten ash resulting from combustion. As seen in FIG. 3, the heat clamp 1 is bent into a circle which closely approximates the outside diameter of the pipe to be heated. When so shaped around a pipe, tongue 6 is passed through aperture 8 and then bent back upon itself to overlie receiving tab 10.

The heat clamp 1 of FIGS. 1–3 is usually secured around a sleeve fitting employed to secure the ends of two pipes. After the fitting and the ends of the pipe have been cleaned and fluxed in a conventional manner, the ends of the pipes to be joined are telescoped within the sleeve and heat clamp 1 is secured around the sleeve. Fuse 20 is ignited by a match causing material 16 to ignite and generate an intense heat sufficient to heat the fitting and pipe for the melting of a solder which is applied to the joints at each end of the sleeve. After the clamp has cooled sufficiently, it is only necessary to unlock tongue 6 from tab 10 and remove the clamp from the pipe. It is clear that clamp 1 can be applied to T and L fittings by using the proper number of clamps.

Figure 4:
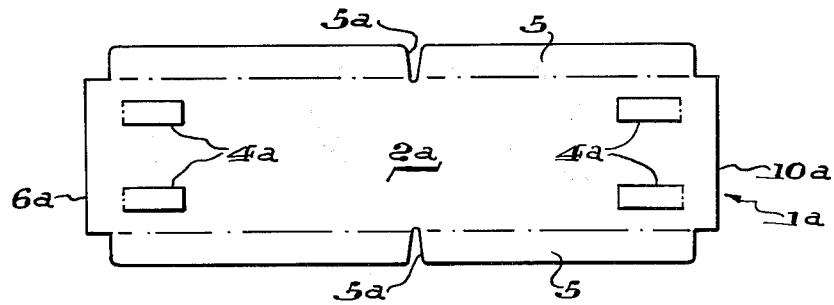
FIG. 4 is a plan view of a modification of the clamp shown in FIG. 1.
Figure 5:
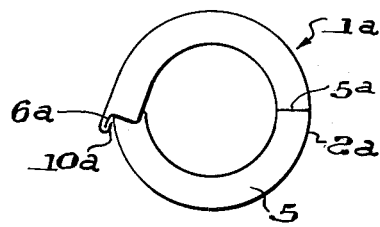
FIG. 5 is a diagrammatic side elevation of the clamp in FIG. 4.

Reference is now made to FIGS. 4 and 5 showing a heat clamp 1a similar to the one shown in FIGS. 1–3. This modified device is used in the same manner as the one above but it is constructed somewhat differently as will now be described. Clamp 1a comprises a strip 2a of the same material as strip 2 and having tabs 4a partially struck from the strip and bendable along lines which are shown as being dotted. Strip 2a comprises side walls 5 which are bent normal (along the dotted bend lines) to the main portion of the strip as best seen in FIG. 5. Slits 5a facilitate the bending of the clamp. Side walls 5 and tabs 4a secure a trough-like housing and asbestos sheet, the same as the ones shown in FIGS. 1 and 2 with the housing containing the same heating components described above. The ends of strip 2a include extending tongue 6a and tab 10a for locking clamp 1a around a pipe. Tab 10a is bent back upon itself around tongue 6a as shown in FIG. 5. This same locking means can be substituted in clamp 1 shown in FIGS. 1–3. A fuse (not shown) is secured to the housing in the same manner and location as fuse 20 in clamp 1. With the exception of these differences, clamp 1a is employed the same way as described above regarding clamp 1.

Figure 6:
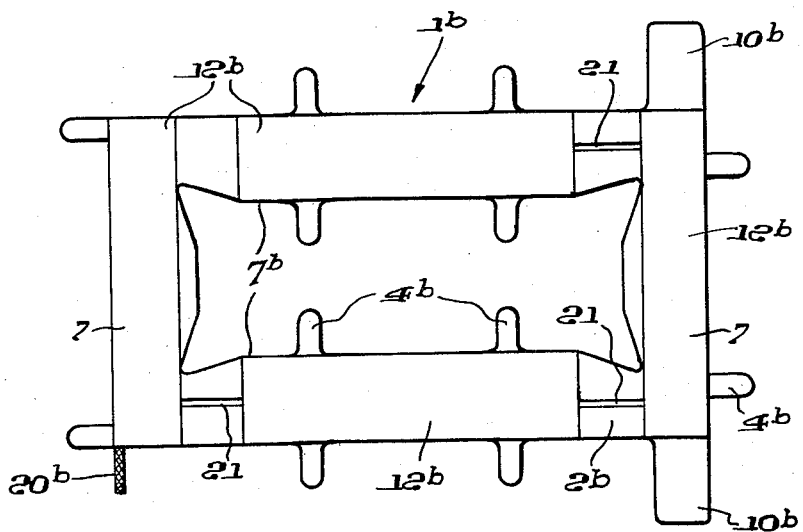
FIG. 6 is a plan view of another form of clamp especially used for T fittings with the housing shown diagrammatically.
Figure 7:
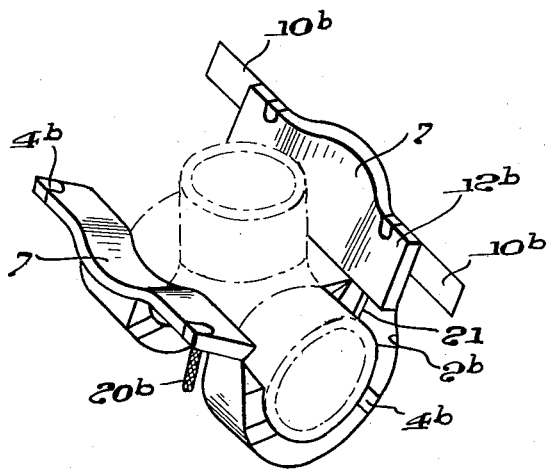
FIG. 7 is a diagrammatic perspective view of the clamp in FIG. 6 and showing it in conjunction with a T fitting.

Referring to FIGS. 6 and 7, heat clamp 1b is produced especially for T fittings and is used in the same fashion as the clamps disclosed above. Clamp 1b comprises a strip 2b of the same material as the strips above and includes spaced end portions 7 and spaced side portions 7b. Also, strip 2b includes tabs 4b arranged to secure four housings 12b and four asbestos sheets (not shown) identical in construction to housing 12 and sheet 18. Housings 12b contain the same heating components as housing 12 but are four in number in this embodiment and disposed on portions 7 and 7b. After clamp 1b has been assembled, end portions 7 may be preformed to conform in shape to the leg of the T when the clamp is bent around the T, or ends 7 may remain flat as shown in FIG. 6 until the clamp is mounted, during which time, the ends may be bent around the leg of the T. Preferably, ends 7 are preformed so that it becomes necessary only to bend the complete clamp around the arms of the T. Clamp 1b is locked to the pipe fitting by tabs 10b which are bent around the opposite end of the clamp. In order to provide a continuous ignition train, fuse 20b is connected to one of the housings 12b and fuses 21 connect the other three housings to the first housing containing fuse 20b. Fuses 21 are secured to the exothermic reaction material in the same manner as fuse 20b.

Figure 8:
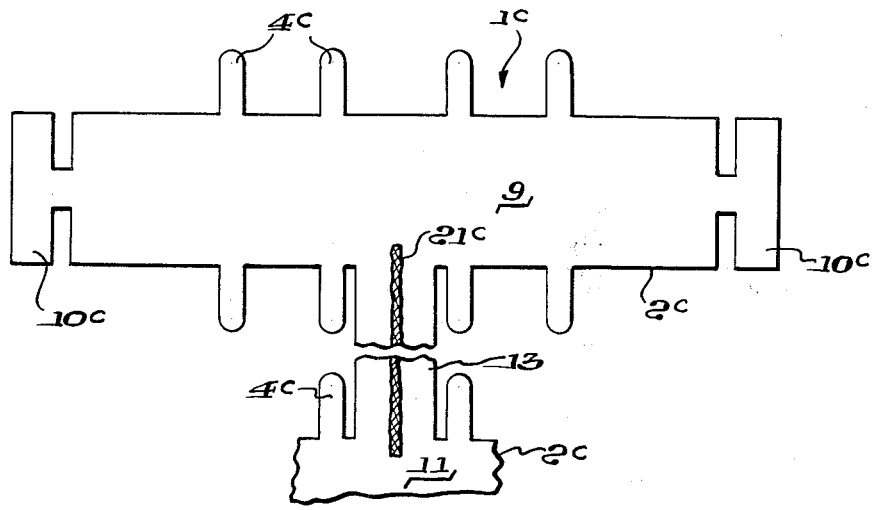
FIG. 8 is a plan view of a further clamp especially used for L fittings.
Figure 9:
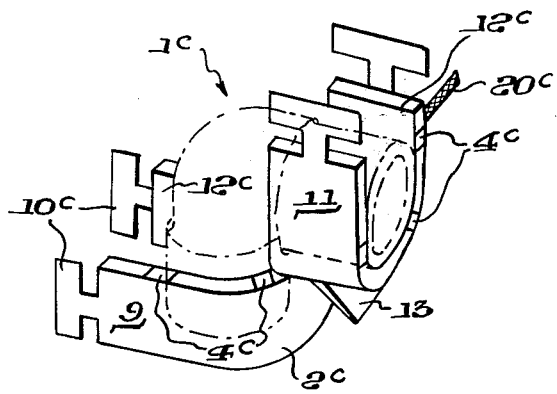
FIG. 9 is a diagrammatic perspective view of the clamp of FIG. 8 and showing it in conjunction with an L fitting.

FIGS. 8 and 9 show clamp 1c especially designed for L fittings. This clamp comprises a flat, flexible metal strip 2c having two identical parallel portions 9 and 11 connected by intermediate strip portion 13. Strip 2c comprises tabs 4c for securing trough-like housings 12c and asbestos layers (not shown) identical to housing 12 and layer 18 shown in FIG. 1 and the housings contain the same heating components therein. Similar locking tabs 10c extend from each end of portions 9 and 11 for securing clamp 1c to an L fitting as is best seen in FIG. 9. The facing surfaces of tabs 10c are pressed together and then twisted to the right or left to thus lock each portion of clamp 1c around the arms of the L fitting. Fuse 21c is connected to the heating materials in housings 12c and constitutes the ignition train between the two portions. Fuse 20c provides the primary fuse for igniting clamp 1c. When clamp 1c is bent around the L fitting, intermediate strip portion 13 is substantially folded upon itself as best seen in FIG. 9. Thusly, a single heat clamp is provided to accommodate an L fitting rather than using two separate clamps such as shown in either FIGS. 1 or 4. It is obvious that the clamps shown in FIGS. 1, 4 and 6 can be easily modified to include tabs 10c as the locking means rather than the ones disclosed.

It is obvious that features of the invention can be modified by those skilled in the art in light of the above teachings. For example, each of the above forms of the invention can comprise flexible metal strips which, when bent, become self-locking with the proper choice of materials, in which case, separate locking means may become unnecessary. Alternatively, rather than integrally attach the various forms of locking means, a separate locking means could be employed. Also, asbestos sheet 18 may be deleted if housing 12 is so constructed as to provide sufficient heat insulation. Noting FIGS. 6 and 8, rather than use fuses 21 and 21c, the heating material could be extended through the housings in abutting relationship to provide the necessary ignition train.

In the above description, it is clear that novel clamps have been provided to overcome the above-mentioned disadvantages inherent when using open flame torches. Moreover, a safe, quick and controlled heat can be applied by the clamps of this invention resulting in superior pipe joints.

Having explained the principle of the present invention and having illustrated and described what is considered to be the best embodiments, it is to be understood that, within the scope of the appended claims, the invention may be practiced otherwise than as specifically illustrated and described.

We claim:

1. A heat clamp for joining pipe comprising a flexible arcuately bendable metal strip having free end portions, housing means secured on said strip, heating material contained within said housing means, said clamp being shaped for substantially conforming to the pipe to be heated with the housing means facing the pipe, and said clamp including releasable locking means for locking the clamp to the pipe and releasing it therefrom.

2. The heat clamp of claim 1, and insulating material positioned between said strip and housing means.

3. A heat clamp for joining pipe comprising a flexible arcuately bendable metal strip having free end portions, heat insulating housing means positioned on said strip within the boundaries thereof, heating material contained within said housing means, insulating material positioned between said strip and said housing means, said strip comprising flexible tabs extending therefrom and bent against said housing means for securing said strip and housing means together, said clamp being shaped for substantially conforming to the pipe to be heated with the housing means facing the pipe, and releasable locking means extending from said strip for locking said clamp to the pipe and releasing it therefrom.

4. The heat clamp of claim 3, wherein said flexible tabs are spaced from the edges of said strip.

5. A heat clamp for joining pipe comprising a flexible arcuately bendable metal strip having spaced side and end portions, heat insulating trough-like housing means secured to said strip, heating material contained within said housing means, and said clamp adapted to be bent around a T pipe fitting to be heated with the housing means facing the fitting.

6. The heat clamp of claim 5, wherein said housing means is positioned on said portions within the boundaries thereof, said strip comprising flexible tabs extending therefrom and bent against said housing means for securing said strip and housing means together, and releasable locking means extending from said strip for locking said clamp to the fitting and releasing it therefrom.

7. A heat clamp for joining pipe comprising a flexible arcuately bendable metal strip having spaced parallel portions connected by an intermediate portion, heat insulating housing means secured to said strip, heating material contained within said housing means, and said clamp adapted to be bent around an L pipe fitting to be heated with the housing means facing the fitting.

8. A heat clamp of claim 7, wherein said housing means is positioned on said parallel portions within the boundaries thereof, said strip comprising flexible tabs extending therefrom and bent against said housing means for securing said strip and housing means together, and releasable locking means extending from said strip for locking said clamp to the fitting and releasing it therefrom.

References Cited by the Examiner

UNITED STATES PATENTS

| 1,779,335 | 10/1930 | Remrey | 229—87 |
| 2,004,315 | 6/1935 | Fean | 217—3 |
| 2,664,844 | 1/1954 | Siegriest et al. | 113—111 |
| 2,667,865 | 2/1954 | Herman | 113—110 |
| 2,745,368 | 5/1956 | Klein | 113—111 |

CHARLES W. LANHAM, *Primary Examiner.*